United States Patent

[11] 3,587,074

[72] Inventors Arthur M. Angle
Rolling Hills Estates;
Reinhard Hurlimann, Granada Hills, both of, Calif.

[21] Appl. No. 861,774
[22] Filed Sept. 29, 1969
[45] Patented June 22, 1971
[73] Assignee Singer-General Precision, Inc.

[54] MAGNETIC DISC ASSEMBLY WITH ANNULAR FLANGE
4 Claims, 2 Drawing Figs.

[52] U.S. Cl. ........ 340/174.1C, 179/100.2 A, 346/74 MD, 346/137
[51] Int. Cl. ........ G11b 5/48, G11b 25/04
[50] Field of Search ........ 340/174.1 C; 274/41.4; 179/100.2 A; 346/137, 74

[56] References Cited

UNITED STATES PATENTS 3,037,205 5/1962 Hagopian ........ 274/41.4
3,090,626 5/1963 Wadey ........ 274/41.4
3,304,527 2/1967 Marrs et al ........ 179/100.2
3,475,741 9/1969 Toney ........ 340/174.1

*Primary Examiner*—Bernard Konick
*Assistant Examiner*—Vincent P. Canney
*Attorneys*—Joseph R. Dwyer and Linval B. Castle

ABSTRACT: A rotating disc memory assembly is provided for electronic digital computers, data processors and the like, which is simple and inexpensive to construct, which requires a minimum number of parts, and yet which provides for a precisely determined spacing between the inner ends of the electromagnetic transducer heads carried by the housing of the assembly and the surface of the rotating memory disc. The assembly to be described includes a rotating hub, which is precisely positioned with respect to the inner surface of the housing mounting plate for the aforesaid heads, and a wedge-shaped annular C-clamp which holds the disc memory firmly against a peripheral shoulder of the hub in an accurately spaced relationship with respect to the inner ends of the heads mounted in the aforesaid mounting plate.

INVENTORS:
Arthur M. Angel
Reinhard Hurlimann
By Joseph R. Dwyer
[signature]
ATTORNEYS INVENTORS
Arthur M. Angel
Reinhard Hurlimann By Joseph Dwyer
[signature]
ATTORNEYS

MAGNETIC DISC ASSEMBLY WITH ANNULAR FLANGE

BACKGROUND OF THE INVENTION

It is well known that in the disc-type memory assemblies it is essential that the inner sensitive ends of the electromagnetic read and write heads supported on the head mounting plate portion of the frame or housing of the assembly be as close as possible to the surface of the rotating disc for optimum sensitivity. It is also essential, however, that the heads do not contact the surface of the disc since permanent damage could result both to the heads and to the disc itself.

The aforesaid requirements have caused most of the prior art magnetic disc memory assemblies to be excessively complicated and expensive, and to include a multiplicity of parts and adjusting mechanisms to enable the heads to be individually adjusted to the correct spacing with respect to the surface of the disc. The complexities of the prior art arrangements not only adds materially to their cost, but also affects their reliability in maintaining the heads and the disc surface at the prescribed optimum spaced relationship.

The assembly of the present invention, on the other hand, is constructed in a simplified manner and includes no adjustment mechanisms for the heads. Instead, the heads may be mounted on the head mounting plate in any appropriate manner, so that their inner ends extend a predetermined distance into the housing. The magnetic memory disc is supported within the housing in a precisely located axial position by means of a hub, which in turn is mounted on the drive shaft of the drive motor.

The disc is supported against a peripheral shoulder which extends around the hub; and it is held firmly in place by means, for example, of a wedge-shaped metallic resilient C-ring. In this way, and without the requirement for any complex adjusting mechanisms, the disc is firmly and securely held at a precisely located axial position with respect to the inner end of the transducer head.

The invention provides, therefore, a simple and inexpensive memory disc assembly, which requires no individual adjustments after manufacture, and which is constructed so that the spacing between the disc surface and the inner ends of the read and write heads carried by the housing is accurately spaced by the structure itself, rather than by subsequent adjustments of the positions of the individual heads, or of the disc.

DETAILED DESCRIPTION OF THE ILLUSTRATED EMBODIMENTS

Figure 1:
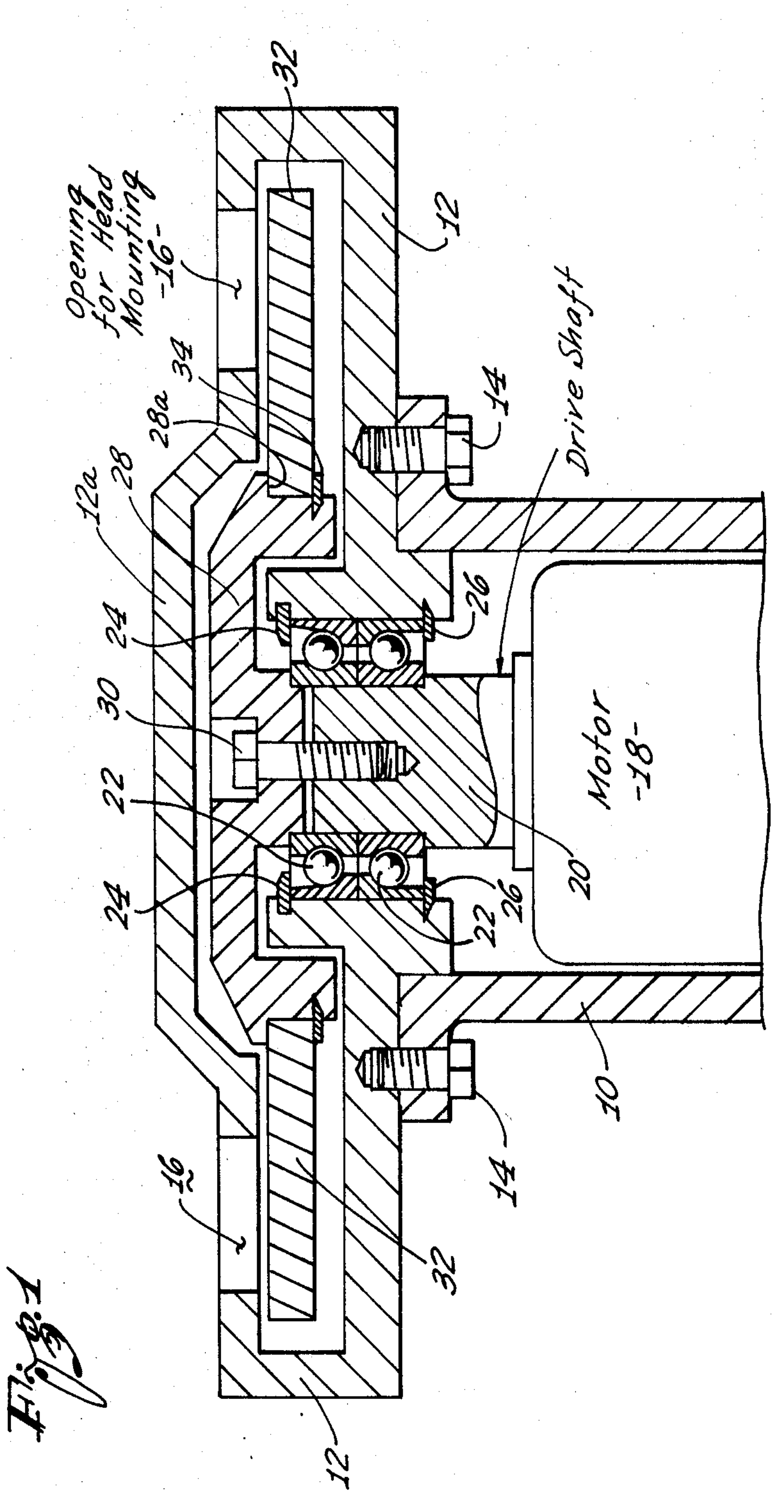
FIG. 1 is a side sectional view of a disc assembly constructed in accordance with one embodiment of the invention.

The magnetic memory disc assembly shown in FIG. 1 includes, for example, a frame 10 which, in the illustrated embodiment has a tubular configuration, and which supports a housing 12 at its upper end, the housing being secured to the frame by means, for example, of appropriate screws 14. The upper end of the housing 12 may be designated the head mounting plate 12*a*, and a plurality of openings 16 are provided in the head mounting plate for supporting the read and write electromagnetic heads of the assembly. The heads may be mounted in the openings 16 in any appropriate way, so that their ends extend a precisely predetermined axial distance into the housing 12.

An electric motor stator 18 is positioned within the frame 10. The housing 12 defines a central bore through which the drive shaft 20 extends. Bearing units 22 are interposed in the bore between the drive shaft 20 and the inner surface of the bore. The drive shaft to which is attached a motor rotor extends into the frame 10 along a central axis within the frame.

One end of the bearings 22 engage a peripheral shoulder on the drive shaft 20, as shown. A channel is provided in the bore adjacent the upper end of the bearings 22, and a resilient metallic annular C-clamp 24 extends into the channel and engages the upper end of the bearings 22. A second peripheral channel is provided in the bore having a wedge-shaped configuration, and adjacent the lower end of the bearings 22. A wedge-shaped resilient metallic C-clamp 26 extends into the latter channel, and engages the lower end of the bearing, as shown. Of course, other appropriate holding means may be used. The bearings are axially preloaded to withstand eccentricities and dynamic environment. That is, there is no dimensional variation so long as the preloading threshold is not exceeded.

A hub 28 is mounted on the end of the drive shaft 20 for rotation with the drive shaft about the aforesaid axis. The hub is held on the end of the drive shaft by means, for example, of a screw 30. The hub has a peripheral shoulder which engages the upper end of the bearings 22. It will be appreciated that the upper end of the bearings may be precisely located with respect to the head mounting plate 12*a* by the location of the C-ring 24, which, in turn, is precisely located in its annular channel in the bore of the housing 12. The C-ring 26, with its wedge-shaped configuration, serves to hold the bearings 22 firmly against the upper C-ring 24. Then, the screw 30 may be tightened until the peripheral shoulder of the hub 28 engages the upper end of the bearings, so that it too is precisely located with respect to the inner surface of the mounting plate portion of the housing 12.

An annular magnetic disc 32 is supported on the hub 28, and is held firmly against a peripheral shoulder formed by a flange 28*a* around the upper edge of the hub. The disc 32 is held against the peripheral shoulder by means, for example, of a wedge-shaped C-ring 34, the ring being supported in a peripheral channel in the hub 28 adjacent the lower face of the disc 32.

As mentioned above, the annular channel which supports the C-ring 24 may be precisely machined in the housing 12 to be located a predetermined distance from the inner surface of the head mounting plate portion 12*a* of the housing 12. The hub 28 may also be precisely machined, as may the shoulder provided by its flange 28*a*. The spacing of the disc 32 from the inner ends of the heads supported on the head mounting plate may therefore be precisely located, and no adjustments of either the heads or of the disc itself need be effectuated.

The resulting assembly, as shown in FIG. 1, for example, is simple and straightforward in its construction, and is relatively simple to assemble. The structure is sturdy and reliable in its operation, and the disc 32 is firmly supported thereby at a precisely predetermined distance from the inner ends of the heads supported in the openings 16 in the head mounting plate. The C-rings described above may, for example, be composed of beryllium copper, and they may, for example, be approximately one-eighth inch thick by three-eighths inch wide by 3 inches internal diameter.

Figure 2:
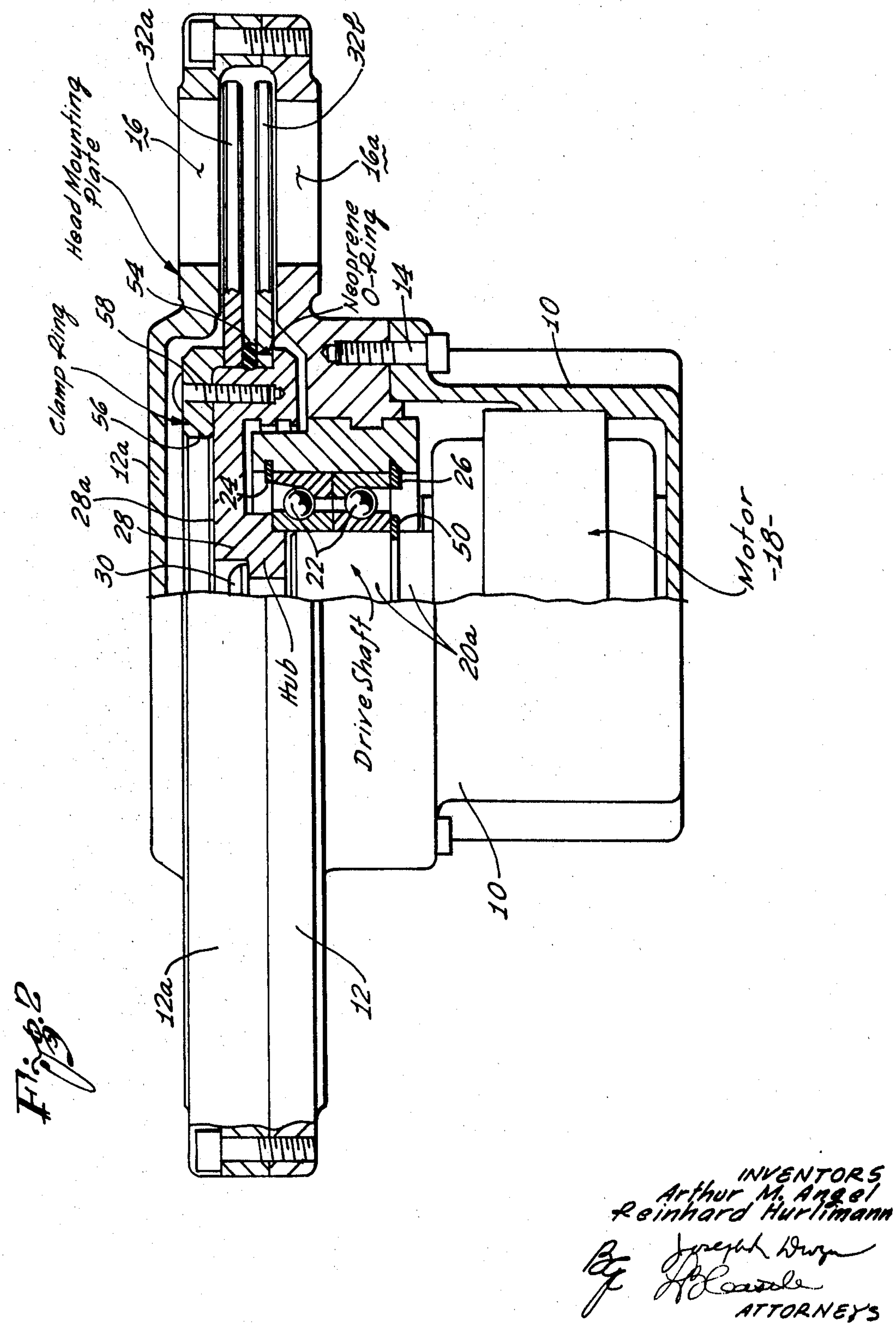
FIG. 2 shows a dual disc assembly representing a modification of the embodiment of FIG. 1.

The embodiment shown in FIG. 2 is essentially the same as the embodiment of FIG. 1 and like components have been designated by the same numbers. In the latter embodiment, and merely as illustrative of a second expedient, the drive shaft 20*a*, instead of having a shoulder formed therein as in the embodiment of FIG. 1 includes a circumferential slot, and a C-ring 50 is positioned in the slot and engages the lower end of the bearings 22, so as to perform the same function as the shaft shoulder in FIG. 1.

The embodiment of FIG. 2 includes a pair of magnetic discs 32*a* which are supported on the hub 28 in spaced relationship, so as to provide a dual-type assembly, A first plurality of read and write heads may be supported in the openings, such as the openings 16 in the upper head mounting plate 12*a*, for magnetic coupling with the upper surface of the disc 32*a*; and a second plurality of electromagnetic heads may be supported in openings such as the openings 16*a* in a lower head mounting plate, for magnetic coupling with the lower surface of the disc 32*b*.

The discs **32*a* and 32*b* are held on the hub 28 as shown, with the lower disc 32*b* engaging a peripheral shoulder of the hub, and with the disc being separated by an O-ring 54 composed of Neoprene, or other appropriate resilient material. A rigid clamping ring 56 is secured to the end of the hub 28*a* by screws, such as the screw 58, and the clamping ring serves to hold the upper disc 32*a* firmly against the resilient ring 54 which, in turn, serves to hold the lower disc 32*b* firmly against the shoulder on the hub 28*a***.

It will be appreciated that the hub **28*a* is precisely indexed axially within the housing in the same manner as in the previous embodiment. The disc 32 is also precisely indexed in the axial direction by the peripheral shoulder which may be accurately machined on the hub. Therefore, the disc 32*b* may be supported so that its lower surface is located at the precisely predetermined distance from the inner ends of the heads supported in the mounting openings, such as the openings 16*a***.

The clamping ring 56, which also may be accurately machined, accurately indexes the disc **32*a*, since the screw 58 is tightened until the ring 56 is in firm engagement with the upper face of the hub 28. The resilient ring 54** merely serves as a yieldable separating means for the two discs, and has no function in the actual axial indexing of the disc.

The assembly of FIG. 2 has the advantage in that it provides double the disc memory capabilities within essentially the same space as the assembly of FIG. 1. As described above, the recording surfaces of the discs **32*a* and 32*b* are maintained in the correct axial positions by the shoulder on the hub 28*a* and by the clamping rings 56, these indexing elements being machined to within the required tolerances to assure that the discs are properly located with respect to the head assemblies which, in the embodiment of FIG. 2**, are mounted on both sides of the discs.

As also mentioned above, the screws, such as the screw 58 are tightened until the clamping ring stops against the surface of the hub. The dimensions are such that in the clamped position, the O-ring 54, or equivalent spring loading means, is under sufficient compression, so that it exerts a force against the inner surfaces of the discs **32*a* and 32*b* and forces the discs respectively against the shoulder on the hub and against the clamping ring 56. Due to the axial force of the compressed O-ring 54**, through the coefficient of friction between the discs and the supporting elements, the discs are held in position and cannot slip.

The discs themselves in the embodiment of FIG. 2 may be manufactured for less cost than in the usual construction, since only one side of each disc need be lapped, and also the nominal thickness of the disc may be reduced, for example, from 0.250 inches to 0.125 inches without the usual severe tolerances on thickness.

The invention provides, therefore, an improved and simplified magnetic disc assembly in which the disc is held in a precisely located and indexed axial position with respect to the transducer heads, this being achieved with a minimum of components and without the need for individual adjustment.

What I claim is:

1. A disc memory assembly for a digital computer, data processor, data storage system, or the like, including: a housing having a mounting plate for electromagnetic transducer heads; hub means rotatably mounted within said housing for rotation about a particular axis and spaced a precisely predetermined distance from the inner surface of said mounting plate, said hub means including an annular flange extending around the periphery thereof; drive means for said hub means; an annular shaped magnetic disc mounted on said hub in concentric relationship therewith for rotation with said hub about said axis; and means on said hub for holding said magnetic disc securely thereon and against said flange in firm engagement with said flange, in which said hub means has a slot extending around the periphery thereof in axially spaced relationship with said flange, and in which said holding means comprises a wedge-shaped resilient metallic C-ring extending into said slot.

2. A disc memory assembly for a digital computer, data processor, data storage system, or the like, including: a housing having a mounting plate for electromagnetic transducer heads; hub means rotatably mounted within said housing for rotation about a particular axis and spaced a precisely predetermined distance from the inner surface of said mounting plate, said hub means including an annular flange extending around the periphery thereof; drive means for said hub means; an annular shaped magnetic disc mounted on said hub in concentric relationship therewith for rotation with said hub about said axis; means on said hub for holding said magnetic disc securely thereon and against said flange in firm engagement with said flange, said holding means comprising an annular resilient member; means including an annular clamp mounted on said hub for holding said resilient member firmly against said disc; and a second annular-shaped magnetic disc interposed between said clamp and said resilient member and supported thereby in axially spaced coaxial relationship with said first named disc on said hub.

3. A disc memory assembly for a digital computer, data processor, data storage system, or the like, including: a housing having a mounting plate for electromagnetic transducer heads; hub means rotatably mounted within said housing for rotation about a particular axis and spaced a precisely predetermined distance from the inner surface of said mounting plate, said hub means including an annular flange extending around the periphery thereof; drive means for said hub means comprising an electric motor having a drive shaft extending along said axis; means for mounting said hub on the end of said drive shaft; an annular shaped magnetic disc mounted on said hub in concentric relationship therewith for rotation with said hub about said axis; means on said hub for holding said magnetic disc securely thereon and against said flange in firm engagement with said flange, and which includes bearing means interposed between said drive shaft and said housing, said hub having a peripheral shoulder engaging one end of said bearing means, and said drive shaft having a peripheral shoulder engaging the other end of said bearing means, so as to position said hub precisely with respect to the inner surfaces of said mounting plate.

4. The combination defined in claim 3, in which said housing includes a first annular channel therein adjacent one end of said bearing means, and a wedge-shaped second annular channel therein adjacent the other end of said bearing means, and which includes a resilient metallic annular C-clamp extending into said first annular channel and engaging said one end of said bearing means, and a resilient metallic wedge-shaped annular C-clamp extending into said wedge-shaped second annular channel and engaging the other end of said bearing means.